United States Patent
Voigt et al.

(10) Patent No.: US 10,005,341 B2
(45) Date of Patent: Jun. 26, 2018

(54) AIR GUIDE NOZZLE FOR VENTILATING THE INTERIOR OF A MOTOR VEHICLE

(75) Inventors: Torsten Voigt, Cologne (DE); Klaus Schorn, Cologne (DE); Ger Anthony Cronin, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 13/410,350

(22) Filed: Mar. 2, 2012

(65) Prior Publication Data
US 2012/0225617 A1    Sep. 6, 2012

(30) Foreign Application Priority Data
Mar. 2, 2011   (DE) .................. 10 2011 004 988

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC .............. B60H 1/00842; B60H 1/3407; B60H 1/3421; B60H 1/3478
USPC ....... 454/139, 143, 145, 150, 152, 154, 155, 454/160, 162, 254, 261, 265, 266, 267, 454/274, 286, 305, 314, 319, 320, 325, 454/327
See application file for complete search history.

(56) References Cited

U.S. PATENT DOCUMENTS

| | | | | |
|---|---|---|---|---|
| 6,131,336 A | * | 10/2000 | Krause et al. | 49/74.1 |
| 6,244,952 B1 | * | 6/2001 | Arold | B60H 1/3407 |
| | | | | 454/145 |
| 2003/0157880 A1 | * | 8/2003 | Nishida et al. | 454/155 |
| 2009/0286462 A1 | * | 11/2009 | Goto | B60H 1/3428 |
| | | | | 454/155 |

FOREIGN PATENT DOCUMENTS

| | | | | |
|---|---|---|---|---|
| DE | 10061060 A1 | * | 6/2002 | B60H 1/34 |
| EP | 1452359 A1 | * | 9/2004 | B60H 1/34 |
| FR | 2671520 A1 | | 7/1992 | |

OTHER PUBLICATIONS

Machine English Translation of DE10061060A1, Lichner et al., Jun. 2002.*
Machine English Translation of European Patent Publication EP1452359.*

* cited by examiner

*Primary Examiner* — Gregory Huson
*Assistant Examiner* — Dana Tighe
(74) *Attorney, Agent, or Firm* — LeClairRyan

(57) ABSTRACT

The invention relates to an air guide nozzle (1) for ventilating the interior of a motor vehicle, the air guide nozzle having an air outlet duct (3) at the first air outlet (4) of which a plurality of pivoted slats (6), which can be pivoted simultaneously about respective longitudinal axes, is arranged in parallel and at a distance from one another, for which purpose said slats are connected by a lever (7) on the side facing away from the air outlet (4), wherein the air guide nozzle (1) has a second, separate air outlet (5) below the first air outlet (4).

12 Claims, 2 Drawing Sheets

AIR GUIDE NOZZLE FOR VENTILATING THE INTERIOR OF A MOTOR VEHICLE

TECHNICAL FIELD

The invention relates to an air guide nozzle for ventilating the interior of a motor vehicle, the air guide nozzle having an air outlet duct at the first air outlet of which a plurality of pivoted slats, which can be pivoted simultaneously about respective longitudinal axes, is arranged in parallel and at a distance from one another, for which purpose said slats are connected by a lever on the side facing away from the air outlet.

BACKGROUND OF THE INVENTION

FIGS. 6 and 7 of FR 2 671 520 A1 disclose a similar air guide nozzle for ventilating the interior of a motor vehicle, having an outlet air duct, at the air outlet of which a plurality of pivoted slats, which can be pivoted simultaneously about respective longitudinal axes, is arranged in parallel and at a distance from one another, for which purpose said slats are connected by a lever on the side facing away from the air outlet. The uppermost pivoted slat in the installed position is additionally connected to a flap in the upper area of the air outlet by a drive rod and an intermediate lever in such a way that, when the pivoted slats are opened (FIG. 6), the flap is closed and, when the pivoted slats are almost closed (FIG. 7), the flap is opened. In the closed position, the flap rests in a sealing manner against a fixed slat above the uppermost pivoted slat. Depending on the position of the pivoted slats, air can thus be directed selectively upward via or through the flap. However, the flap is arranged parallel to the slats and they therefore "share" the air stream.

However, an air guide nozzle from which the air emerges in a more targeted manner and, especially when installed in a dashboard, emerges specifically into the hip area of the occupants, which is difficult to reach, is desirable.

SUMMARY OF THE INVENTION

This object is achieved by the air guide nozzle as disclosed herein.

The fact that the air guide nozzle has a second, separate air outlet below the first air outlet makes it possible to direct the air stream thus produced in a targeted manner into the lower area of the vehicle, very largely independently of the first air outlet.

In a preferred embodiment, the second air outlet is connected to the first air outlet by a flap. The air flow produced by the first air outlet can thus be influenced and controlled in a specific way by means of the flap for the second air outlet. Thus, as it comes from the air outlet duct, the air flow is first passed through the pivoted slats and is influenced there. Only then does the air reach the flap for the second air outlet.

It is therefore expedient if the flap is arranged behind the pivoted slats in the direction of air flow.

It is expedient if the flap is driven via the lowest pivoted slat and if, in addition, it is operatively connected to the lowest pivoted slat by way of a slotted lever. A simple construction is then obtained, and the pivoted slats and the flap can be actuated by means of a common actuating element engaging on one pivoted slat (preferably the central slat) in a known manner, for example.

For this purpose, the slotted lever can be pivotally connected to the air-outlet end of the lowest pivoted slat. To achieve this, the pivoted slat can have a cam lever.

In order to direct the air stream specifically in the desired direction, it is preferred if the longitudinal center planes of the air outlets diverge from one another by between 30 and 90 degrees, in particular by about 60 degrees.

In order to influence and control the air flow behavior to give the desired favorable supply to the hip area of the occupants, it is advantageous if the first and the second air outlet are connected to one another in terms of flow in such a way that both air outlets are closed or do not carry a flow of air, i.e. are not supplied, when the pivoted slats are closed.

It is furthermore advantageous in this context if the first and the second air outlet are connected to one another in terms of flow in such a way that the second air outlet is closed or does not carry a flow of air, i.e. is not supplied, when the pivoted slats are fully raised (extending approximately parallel to the longitudinal center plane).

It is likewise advantageous in this context if the first and the second air outlet are connected to one another in terms of flow in such a way that both air outlets are supplied when the pivoted slats are partially raised (extending at an angle to the longitudinal center plane or in a pivoted position between closed and fully opened), the supply ratio depending on the pivoting angle of the pivoted slats.

BRIEF DESCRIPTION OF THE DRAWINGS

Further details, features and advantages of the invention will emerge from the following description of an embodiment with reference to the drawing, in which.

DETAILED DESCRIPTION OF THE PREFERRED EMBODIMENT

Figure 1:
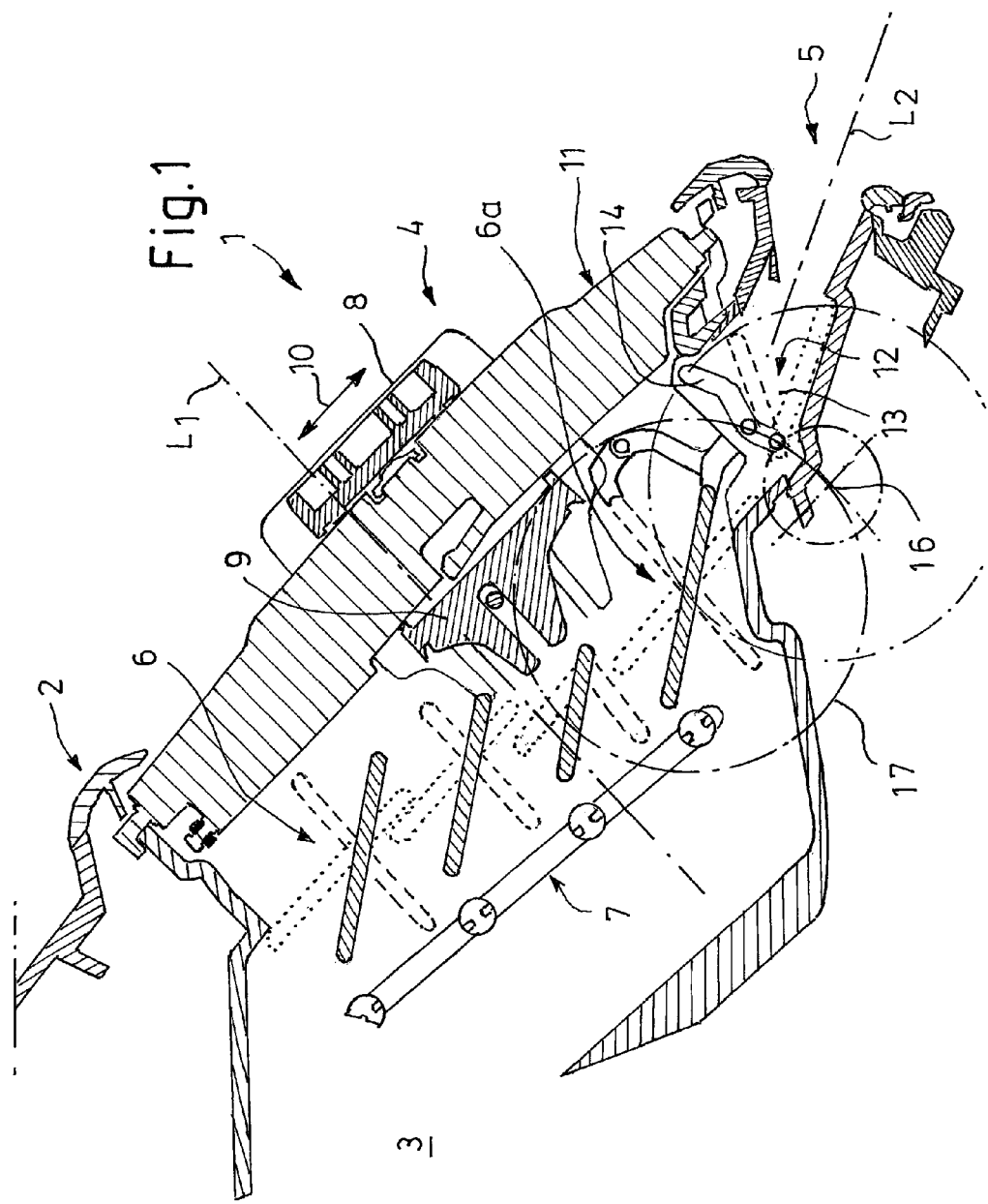
FIG. 1 shows a schematic longitudinal section through an air guide nozzle in three different positions of the pivoted slats and of the flap.
Figure 2:
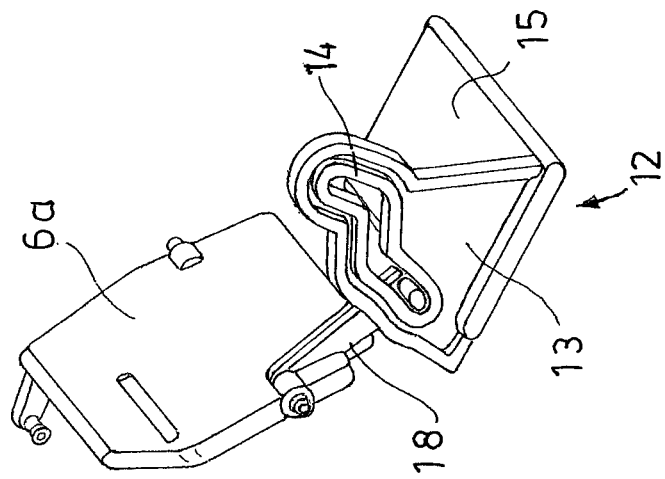
FIG. 2 shows a schematic view of the lowest pivoted slat and of the flap from FIG. 1, wherein the flap is in the closed position.
Figure 3:
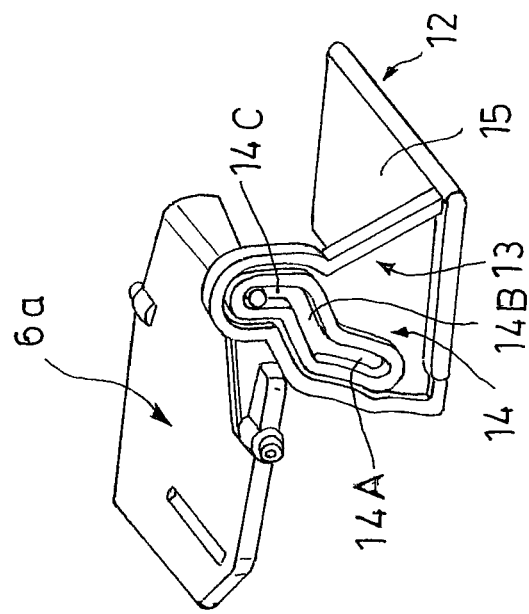
FIG. 3 shows a schematic view of the lowest pivoted slat and of the flap from FIG. 1, wherein the flap is in the opened position.

The figures show an air guide nozzle, denoted overall by 1, for ventilating the interior of a motor vehicle.

The air guide nozzle 1 is arranged in a dashboard 2 and is supplied with air from behind from a vehicle ventilation system or air-conditioning system etc. (not shown) via an air outlet duct 3.

The air guide nozzle 1 has two air outlets 4, 5 on the side facing the interior of the vehicle or in the direction of air flow.

The first air outlet 4 is arranged above the second air outlet 5.

The first air outlet 4 is aligned substantially with the chest and head area of the occupants, i.e. the longitudinal center plane L1 thereof is aligned accordingly.

The second, lower air outlet 5 is aligned substantially with the hip area of the occupants, i.e. the longitudinal center plane L2 thereof is aligned accordingly.

The longitudinal center planes L1 and L2 form an angle of approximately 60 degrees with respect to one another.

Arranged at the first air outlet 4, in parallel and at a distance from one another, is a plurality of pivoted slats 6, which can be pivoted simultaneously about respective longitudinal axes (extending in the direction of viewing), for which purpose the slats are connected to one another in an articulated manner by a lever 7 on the side facing away from the air outlet 4.

To enable the pivoted slats 6 to be moved or adjusted, a slider 8 mounted on a grille 11 is connected in a known manner, by way of a slotted guide 9, to a central pivoted slat in such a way that moving the slider 8 in the direction of arrow 10 brings about an adjustment of the pivoted slats 6 between a first, closed end position (indicated by dotted slats 6) and a second, fully opened or raised end position (indicated by dashed slats 6).

In the first, closed end position, the pivoted slats 6 are aligned transversely to the direction of flow of the air in the air outlet duct 3 and rest against one another in a sealing manner in order to prevent air from emerging.

In the second, completely opened end position, the pivoted slats are arranged approximately perpendicularly to the first end position and extend parallel to one another, allowing air to pass unhindered between them to the first air outlet 4. The air flow moves approximately in the direction of longitudinal center plane L1.

In the positions in between, on the other hand, the pivoted slats 6 are aligned obliquely and the air flow is aligned in a direction obliquely below longitudinal center plane L1 and more in the direction of longitudinal center plane L2.

In order to achieve this, the first and the second air outlet 4, 5 are connected to one another in terms of flow in such a way that both air outlets 4, 5 are closed when the pivoted slats 6 are closed, the second air outlet 5 is closed when the pivoted slats 6 are fully raised and both air outlets 4, 5 are supplied when the pivoted slats 6 are partially raised, the supply ratio depending on the pivoting angle of the pivoted slats 6.

For this purpose, the second air outlet 5 is connected to the first air outlet 4 by a flap 12. The flap 12 is driven via the lowest pivoted slat 6a. The flap 12 is operatively connected to the lowest pivoted slat by way of a slotted lever 13. The slotted lever 13 is pivotally connected to the air-outlet end of the lowest pivoted slat 6a, and the flap 12 is arranged behind the pivoted slats 6 in the direction of air flow.

In the closed, first end position of the pivoted slats 6 (dotted lines), the flap 12 is admittedly in an opened position (dotted lines) and rests flat and in an approximately parallel position against a wall of the air outlet 5, but the second air outlet 5 is not supplied with air since it is behind the pivoted slats 6 as seen in the direction of flow of the air.

In the opened, second end position of the pivoted slats 6 (dashed lines), on the other hand, the flap 12 is in a closed position (dashed lines) and is arranged transversely, closing the air outlet 5, and makes sealing contact between the walls of the air outlet 5.

In the intermediate positions of the pivoted slats 6, both air outlets 4, 5 are supplied, the supply ratio depending on the pivoting angle of the pivoted slats 6.

In order to achieve this movement of the flap 12 by pivoting the lowest pivoted slat 6a, the slotted lever 13 is connected integrally to the flap 12 and rises approximately vertically from one side of the flap surface 15, and the guide slot 14 of the slotted lever 13 is of approximately "Z"-shaped design.

The flap 12 and the slotted lever 13 integral therewith have a center of rotation 16 (cf. FIG. 1).

The air-outlet end of the lowest pivoted slat 6a has a circular path of motion 17. As can be seen from FIG. 1, the center of rotation 16 lies on the circular path 17.

The guide slot 14 has essentially three sections 14A, 14B and 14C, which control movement of the flap 12.

The first section 14A and the third section 14C are matched to the circular path 17, with the result that, in the first, closed end position of the pivoted slats 6 and hence in the opened position of the flap 12 (dotted lines) and in the second end position of the pivoted slats 6 and hence in the closed position of the flap 12 (dashed lines), they lie on the circular path 17.

The effect is that the flap 12 does not undergo any movement in the region of the respective end position but is only actually moved in the central section 14B.

This central section 14B corresponds to a pivoted position or pivoting angle range of the pivoted slats 6 and 6a in which the air stream through the pivoted slats is in any case forced or directed in the direction of the second air outlet 5.

For engagement in the guide slot 14, the lowest pivoted slat 6a has a cam lever 18, which projects from the front side, i.e. at the front in the direction of flow or from the side of the slat 6a facing the first air outlet 4, and engages in the guide slot 14 by means of an end cam.

The air flow through the series arrangement of the pivoted slats 6 and the flap 12 or second air outlet 5 is thus skillfully used.

Moreover, the backpressure of the air which arises from the pivoted position of the pivoted slats 6 is advantageously directed through the flap 12.

LIST OF REFERENCE SIGNS

1 air guide nozzle
2 dashboard
3 air outlet duct
4 first air outlet
5 second air outlet
6 pivoted slat
6a lowest pivoted slat
7 lever
8 slider
9 slotted guide
10 arrow
11 grille
12 flap
13 slotted lever
14 guide slot
14A, B, C sections of the guide slot
15 flap surface
16 center of rotation
17 circular path
18 cam lever
L1, L2 longitudinal center plane

The invention claimed is:

1. An air guide nozzle for ventilating an interior of a motor vehicle, the air guide nozzle comprising:
   an air outlet duct;
   a first air outlet in fluid communication with the air outlet duct in which is provided a plurality of pivotable slats including a lowest pivotable slat which are pivotable about respective longitudinal axes, said lowest pivotable slat having a circular path of motion;
   a second air outlet adjacent to the first air outlet, wherein the second air outlet includes a closeable flap that is connected to the lowest pivotable slat of the plurality of pivotable slats, the lowest pivotable slat including a cam end extending from a side of the lowest pivotable slat, wherein motion of the closable flap is driven by rotation of the lowest pivotable slat, said plurality of pivotable slats being movable to a first closed end position and a second end position;

a slotted lever that includes a multi-section slot and that connects the closeable flap to the lowest pivotable slat by receiving the cam end in the multi-section slot, the multi-section slot having a middle portion and two end portions, said two end portions matching said circular path when said plurality of pivotable slats are in said first closed end position and in said second end position.

2. The air guide nozzle as claimed in claim 1, wherein the closeable flap is arranged behind the plurality of pivotable slats in the direction of air flow.

3. The air guide nozzle as claimed in claim 1, wherein the longitudinal center planes of the first and second air outlets diverge from one another by between 30 and 90 degrees, in particular by about 60 degrees.

4. The air guide nozzle as claimed in claim 1, wherein the first and the second air outlets are connected to one another in terms of flow in such a way that both of the first and second air outlets are closed when the plurality of pivotable slats are closed.

5. The air guide nozzle as claimed in claim 4, wherein the first and the second air outlets are connected to one another in terms of flow in such a way that both of the first and second air outlets are supplied when the plurality of pivotable slats are partially raised, the supply ratio depending on the pivoting angle of the plurality of pivotable slats.

6. The air guide nozzle as claimed in claim 1, wherein the first and the second air are connected to one another in terms of flow in such a way that the second air outlet is closed when the pivotable slats are fully raised.

7. The air guide nozzle as claimed in claim 6, wherein the first and the second air outlets are connected to one another in terms of flow in such a way that both of the first and second air outlets are supplied when the plurality of pivotable slats are partially raised, the supply ratio depending on the pivoting angle of the plurality of pivotable slats.

8. The air guide nozzle as claimed in claim 1, wherein the closeable flap is arranged behind the plurality of pivotable slats in the direction of air flow.

9. The air guide nozzle as claimed in claim 1, wherein the longitudinal center planes of the first and second air outlets diverge from one another by between 30 and 90 degrees, in particular by about 60 degrees.

10. The air guide nozzle as claimed in claim 1, wherein the first and the second air outlets are connected to one another in terms of flow in such a way that the second air outlet is closed when the plurality of pivotable slats are fully raised.

11. An air guide nozzle for ventilating an interior of a motor vehicle, the air guide nozzle comprising:

an air outlet duct;

a first air outlet;

a separate air outlet positioned below the first air outlet;

a plurality of pivotable slats fitted at least partially within the first air outlet, the plurality of pivotable slats having a center, the majority of the plurality of pivotable slats being centrally pivotable about their centers, said plurality of pivotable slats including a lowest slat, said lowest slat having a circular path of motion, said plurality of pivotable slats being movable to a first closed end position and a second end position;

a closable flap being positioned in the separate air outlet and operably coupled to said lowest slat of the plurality of pivotable slats, wherein the closeable flap is positioned behind the plurality of pivotable slats, such that the lowest pivotable slat is proximal to the air outlet duct relative to the closable flap and the closable flap is distal to the air outlet duct relative to the lowest pivotable slat; and a slotted lever connecting the closeable flap to the lowest pivotable slat, the slotted lever including a multi-section slot having a middle portion and two end portions, wherein the two end portions are shaped to correspond with a path and the middle portion provides a cam mechanism to rotate the closable flap, said middle portion and said two end portions matching said circular path when said plurality of pivotable slats are in said first closed end position and in said second end position.

12. An air-guide nozzle for ventilating an interior of a motor vehicle, the air guide nozzle comprising:

a grille;

an air outlet duct;

a first air outlet having an air-supply side and an air-distribution side, wherein a direction of air flow extends from the air-supply side to the air-distribution side;

a second air outlet positioned below the first air outlet;

a plurality of pivotable slats fitted at least partially within the first air outlet between the air outlet duct and the grille, the plurality of pivotable slats having lengths, the lengths of some of the slats being different from the lengths of other slats, said plurality of pivotable slats being movable to a first closed end position and a second end position, wherein the plurality of pivotable slats contains a lower-most pivotable slat having a front portion oriented toward the air-distribution side and a rear portion oriented toward the air-supply side, said lower-most pivotable slat having a circular path of motion;

wherein a cam lever having an end cam projects from the lower-most pivotable slat and toward the front portion; and wherein the end cam moves in a substantially circular path when the lower-most pivotable slat pivots about a longitudinal axis;

a closeable flap that is positioned in the separate air outlet and is operably coupled to the lower-most pivotable slat of the plurality of pivotable slats; and a slotted lever that includes a multi-section slot having a middle portion and two end portions and that connects the closeable flap to the lower-most pivotable slat by receiving the end cam in the multi-section slot, wherein a configuration of the multi-section slot is such that the two end portions align in the substantially circular path when the lower-most pivotable slat pivots about the longitudinal axis, such that the two end portions avoid a cam action by the end cam, said middle portion and said two end portions, said two end portions matching said circular path when said plurality of pivotable slats are in said first closed end position and in said second end position.

* * * * *